April 18, 1933. A. I. DUNN 1,904,941
VALVE RESEATING TOOL DRIVER
Filed Aug. 12, 1929
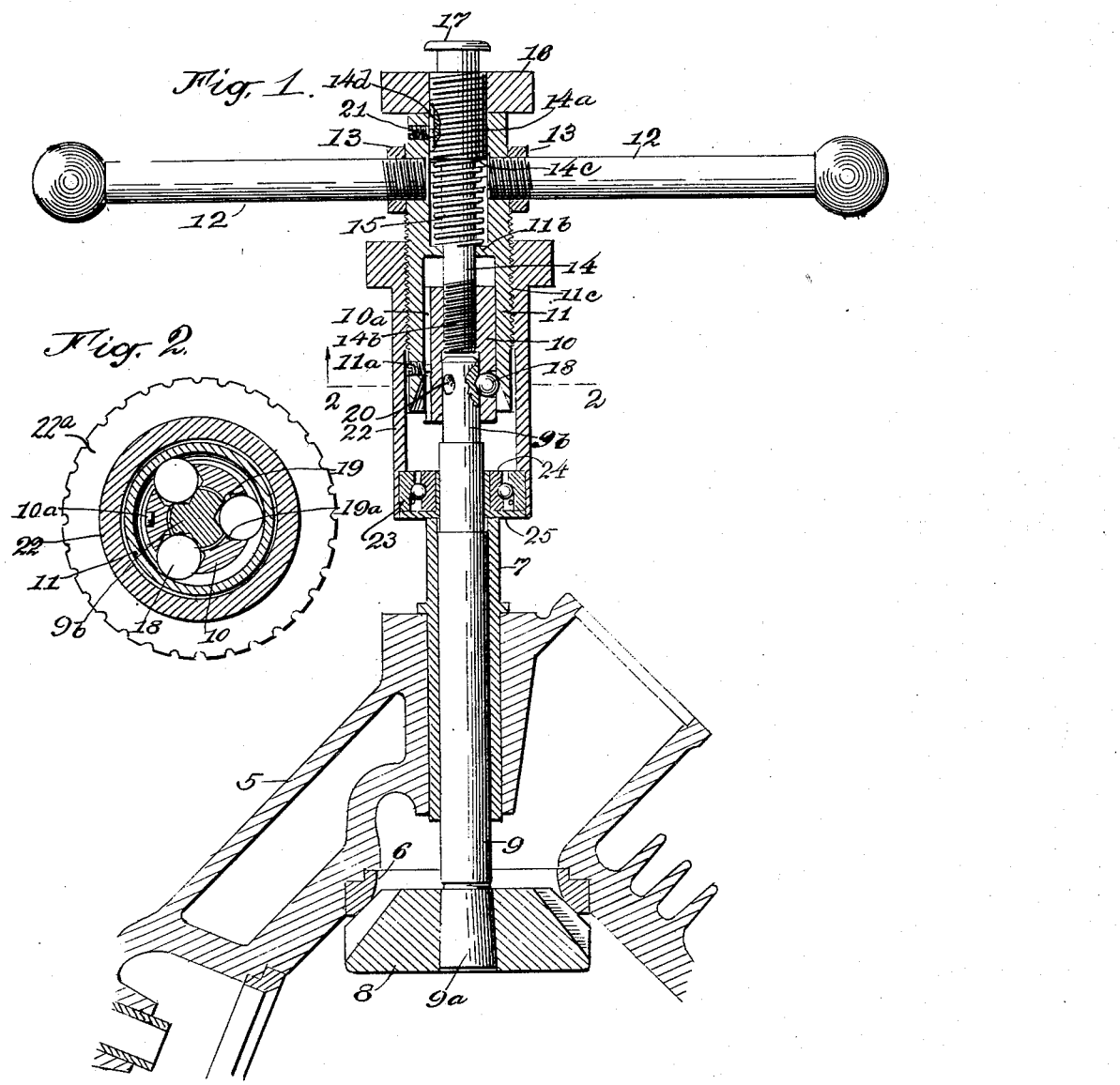

Patented Apr. 18, 1933

1,904,941

UNITED STATES PATENT OFFICE

ALLEN I. DUNN, OF CEDAR RAPIDS, IOWA, ASSIGNOR TO CEDAR RAPIDS ENGINEERING COMPANY, OF CEDAR RAPIDS, IOWA

VALVE RESEATING TOOL DRIVER

Application filed August 12, 1929. Serial No. 385,436.

This invention relates to tools used in dressing and reaming the seats of gasoline engine valves, more particularly those of engines of the valve-in-head type, such as airplane engines, in which the valves are seated inwardly with respect to the cylinder, and are thrust outwardly to close.

The object of the invention is to provide an improved driver for the reamer pilot, so constructed and arranged as to be easily and quickly attached to any pilot; to hold the same securely and in axial centricity; to make possible any required adjustment with respect to the lengths of the pilot and its guide, and to feed the valve-seat reamer nicely and accurately in redressing said seat.

The invention is fully disclosed in the description and claims following, reference being had to the accompanying drawing, in which:

Fig. 1 is a central, longitudinal section of a tool embodying the invention as in use.
Fig. 2 is a cross-section of the same in the line 2—2, looking up.

In the drawing, the numeral 5 denotes a sectional fragment of the cylinder block of an air-plane engine of a familiar type. The valve seat 6 is herein shown as inset, which is usually the preferred construction. Perpendicular to the valve-seat and central thereto is the pilot guide 7, herein shown as a bushing securely set in the engine block.

A reamer 8 of a familiar type is shown mounted on the tapered head 9a of the tool pilot 9, which fits nicely, but turnably in the guide. The opposite end of the pilot is formed as a shank 9b, to be more fully described hereafter. In practice the pilot with the reamer attached is inserted into the pilot-guide from the inside of the engine cylinder, and, to the projecting upper end of the shank aforesaid, is attached the driving chuck, which will now be described.

A tubular member 10 is bored at one end to fit or nearly fit the shank of the pilot. In the drawing a close fit is shown, but in practice this is not necessary. The shank should be at least as small as the shaft of the pilot, and shafts will vary according to the sizes of varying valve-stems, but considerable latitude in the size of the shanks is allowable, relatively smaller than herein shown, since the centering and driving of the pilot are independent of the adjacent walls of the member 10. This member is mounted slidably in a sleeve 11, to which is connected near the upper end a pair of handles 12, preferably by screw threads and lock nuts 13, as shown. By means of a longitudinal groove 10a in the chuck member 10, and an engaging screw 11a in the sleeve the member 10 is prevented from turning, but may be adjusted up or down in the sleeve, as desired. This adjustment is effected by the use of a screw 14, which is doubly threaded, as shown. A large threaded portion 14a slides in the chambered upper end of the sleeve, and the threaded lower end of the reduced stem 14b screws into the upper end of the member 10. The lower end of the stem serves as a stop for the shank of the pilot when inserted in the chuck, as will be explained presently. Surrounding the stem in the chamber is a coil spring 15, with one end abutting on a shoulder 11b of the sleeve and the other against the shoulder 14c of the screw. This, as will be evident, forces the chuck member 10 upwardly to the limit of its movement in the sleeve when detached from the pilot shank. On the larger thread of the screw is mounted a set-nut 16, which, when screwed down, as shown, draws the chuck into gripping position, and when backed off against the button 17 allows the chuck member to be pressed downwardly to admit the pilot shank, or release the same.

In the holes piercing the walls of the chuck member are set steel balls 18, preferably three in number. The holes 19 are not drilled full size clear through, lips 19a being left to hold the balls from passing through inwardly when the shank is withdrawn. Outwardly they are retained by the walls of the enclosing sleeve.

The sleeve is made bell-mouthed, as shown, and when the chuck member is pressed downwardly the balls may move outwardly and away from the pilot shank, which is indented with shallow seats 20 to receive portions of the peripheries of the balls, as best shown in Fig. 2.

It will be evident that when the chuck member is drawn upwardly by the hand-nut 16, with the pilot shank in position as in Fig. 1, the pilot will be held rigidly and unturnably in the chuck. To either chuck the pilot, or release the same, is very simple. The pilot being thrust up through the guide from below, and the hand-nut being backed up, the operator with the other hand grasps the tool around the upper middle portion, thereby pressing the chuck member and its connections downwardly with respect to the sleeve, and slips the chuck over the shank. In so doing the end of the shank abuts the end of the screw 14b and is located with respect to the balls. As soon as released the chuck member is carried upwardly in the sleeve by the spring, and a tensional chucking contact is made when the balls coincide with the pits in the pilot shank. If not in direct alignment, a slight turn of the chuck or the pilot will bring the balls and pits into alignment. The hand nut now being turned down the chuck makes a firm grip on the shank, and the pilot is thus held centrally and rigidly in operative position.

Assuming that the pits in the pilot shanks are uniformly made at the same distance from the ends of all shanks, as they may be, the adjustment of the screw abutment 14b need not be changed, when once set. To prevent accidental shifting of the screw it may be locked by a set-screw 21 engaging a groove 14d in the screw 14.

The device for holding the reamer to its work and gradually advancing its feed is described as follows:

On its outside the sleeve 11 is threaded at 11c and on this thread is mounted a tubular shell 22 provided with an enlarged and knurled head 22a for convenience in turning and also to afford a grip for the fingers in collapsing the chuck, as above described. In the lower end is tightly fitted the outer ball-race 23 of a ball-bearing. To the inner race 24 is tightly attached a flanged collar 25 bored to admit turnably a portion of the pilot below the shank. When the tool is in the working position, as shown in Fig. 1, this collar rests as an abutment on the upper end of the pilot guide, or its support and thus resists the end-thrust of the reamer. Gradual turning of the shell by the operator will of course increase or diminish the cutting action of the reamer, as desired. Such movement of the shell is independent of the turning movement of the chuck and reamer. At other times the shell revolves with the reamer, the friction of the screw 11c being always in excess of the friction of the ball-bearing.

The conical, or bell-mouthed interior of the sleeve, as above noted, serves to force the balls inwardly with a tight grip on the shank, and so holds it rigidly in true working position. It also compensates for inaccuracies in machining; compensates for wear, and makes possible the use of pilots varying considerably in the sizes of their shanks.

In practice the use of a plurality of balls, and especially such a number as when pressed inwardly by the sleeve will center the shank, is preferable. It is, however, possible to use a single ball for gripping the shank, as will appear in the appended claims. This construction corresponds to what is shown in Fig. 1, wherein the shank is centered by the closely fitting chuck member. When a loosely fitting shank is used, a construction corresponding to Fig. 2 is more desirable.

Having thus described my invention, I claim:

A tool holder for the purpose indicated comprising a chuck member having a longitudinal groove in its external surface, a sleeve having an inwardly tapering opening in its forward end and surrounding said chuck member and having an inward projection to cooperate with said groove, said sleeve having an external screw-threaded surface, a sleeve having its internal cylindrical surface screw-threaded to engage the screw threads of the first mentioned sleeve and cooperate therewith, said chuck member having a ball mounted in the wall thereof to move transversely thereof, said first mentioned sleeve being adapted, when moving longitudinally relatively to the chuck member, to cause said ball to move inwardly into gripping position or to permit said ball to move outwardly into tool-releasing position, and resilient means in said first mentioned sleeve to actuate said chuck member inwardly to cause the ball to assume tool-gripping position.

In testimony whereof I affix my signature.

ALLEN I. DUNN.